(12) United States Patent
Hall et al.

(10) Patent No.: US 7,183,000 B2
(45) Date of Patent: *Feb. 27, 2007

(54) METHOD OF PROVIDING A PHOSPHORESCENT COATING SYSTEM THROUGH WET-ON-WET APPLICATION AND A PHOSPHORESCENT COATING SYSTEM THEREOF

(75) Inventors: Jon Hall, Oxford, MI (US); Michael Jakobi, Farmington Hills, MI (US)

(73) Assignee: BASF Corporation, Southfield, MI (US)

( * ) Notice: Subject to any disclaimer, the term of this patent is extended or adjusted under 35 U.S.C. 154(b) by 677 days.

This patent is subject to a terminal disclaimer.

(21) Appl. No.: 09/932,802

(22) Filed: Aug. 17, 2001

(65) Prior Publication Data

US 2003/0039820 A1    Feb. 27, 2003

(51) Int. Cl.
*B05D 5/12* (2006.01)
*B32B 27/06* (2006.01)

(52) U.S. Cl. .................. 428/323; 428/325; 427/74; 427/157; 427/407.1; 427/487

(58) Field of Classification Search ........... 428/323, 428/328; 427/212, 218, 331, 402
See application file for complete search history.

(56) References Cited

U.S. PATENT DOCUMENTS

| | | | |
|---|---|---|---|
| 2,595,734 A | 5/1952 | Toulmin, Jr. | |
| 5,024,898 A | 6/1991 | Pitts et al. | |
| 5,424,006 A | 6/1995 | Murayama et al. | ... 252/301.4 R |
| 5,472,737 A | 12/1995 | Anders | ............ 427/137 |
| 5,585,427 A * | 12/1996 | Schimmel et al. | ........ 524/377 |
| 5,698,301 A * | 12/1997 | Yonetani | ............ 428/213 |
| 5,874,491 A | 2/1999 | Anders | ............ 523/457 |
| 5,891,361 A | 4/1999 | Fane | ........ 252/301.4 H |
| 5,998,525 A | 12/1999 | Wang et al. | .......... 524/425 |
| 6,005,024 A * | 12/1999 | Anders et al. | .......... 523/172 |
| 6,036,999 A * | 3/2000 | Zhao et al. | .......... 427/215 |
| 6,117,931 A * | 9/2000 | Rehfuss et al. | ......... 524/441 |
| 6,162,490 A | 12/2000 | Graves et al. | |
| 6,207,077 B1 | 3/2001 | Burnell-Jones | ...... 252/301.36 |
| 6,242,056 B1 | 6/2001 | Spencer et al. | .......... 427/512 |
| 2002/0019312 A1* | 2/2002 | Ramsden | ............ 503/227 |

FOREIGN PATENT DOCUMENTS

| | | |
|---|---|---|
| FR | 1 036 365 | 9/1953 |
| JP | 11048399 A * | 2/1999 |
| JP | 2000-271534 | * 10/2000 |
| WO | WO 00/36208 | 6/2000 |
| WO | WO 00/75242 | 12/2000 |

* cited by examiner

*Primary Examiner*—Monique R. Jackson

(57) ABSTRACT

A phosphorescent coating system and a method of providing the coating system on a substrate are disclosed. The method includes applying a color-providing composition, such as a pigmented basecoat composition, and applying a clearcoat composition. After application and cure, the color-providing composition forms a color-providing film layer, and the clearcoat composition forms a clearcoat film layer. The color-providing composition and the clearcoat composition are cross-linkable. Either one, or both, of the color-providing composition and the clearcoat composition include phosphorescent pigment. The color-providing composition is applied to the substrate to form an uncured film layer of the color-providing composition. Next, the clearcoat composition is applied wet-on-wet to the uncured film layer of the color-providing composition such that an uncured film layer of the clearcoat composition is formed on the uncured film layer of the color-providing composition.

67 Claims, No Drawings

METHOD OF PROVIDING A PHOSPHORESCENT COATING SYSTEM THROUGH WET-ON-WET APPLICATION AND A PHOSPHORESCENT COATING SYSTEM THEREOF

FIELD OF THE INVENTION

The subject invention generally relates to a phosphorescent coating system and a method of providing the phosphorescent coating system on a substrate. More specifically, the subject invention relates to a cross-linkable, phosphorescent coating system that includes phosphorescent pigment for wet-on-wet application to an automotive body panel.

BACKGROUND OF THE INVENTION

Use of phosphorescent pigment is known. For instance, U.S. Pat. Nos. 5,472,737 and 5,874,491 incorporate phosphorescent pigment into phosphorescent paint compositions that are used as highway or roadway paint compositions. Use of phosphorescent pigment in automotive and other coating systems is also known in the art. For instance, U.S. Pat. No. 6,242,056 incorporates phosphorescent pigment, specifically phosphorescent-coated beads, into reflective, heat-cured paint coating systems to enhance the light emission of the paint coating system.

The conventional use of phosphorescent pigment in conventional coating systems is inadequate for various reasons. Many compositions that are used to form the coating systems with the phosphorescent pigment are not cross-linkable. Examples of compositions that are not cross-linkable are disclosed in the '737 and '491 patents. Due to the lack of cross-linking, these compositions are not suitable for automotive coating systems where durability and the physical integrity of the coating system, relative to weathering and exposure, is paramount. Furthermore, many coating systems, such as the coating system disclosed in U.S. Pat. No. 5,998,525, do not provide for multiple film layers for making-up the coating system. Unlike the coating system of the '525 patent, the present invention provides a method for wet-on-wet application of multiple film layers, such as a clearcoat film layer, to achieve excellent gloss and DOI. For these reasons, the prior art compositions are not suitable for automotive coating systems where multiple film layers are required that provide acceptable appearance, as measured by gloss and DOI. In fact, some DOI measurements for the prior art compositions do not even register on typical DOI meters.

The conventional use of phosphorescent pigment in conventional coating systems is also inadequate because the phosphorescent pigment in some conventional coating systems must be completely encapsulated within a particular film layer to be able to produce the desired light emission of the coating system. An example of such a conventional coating system is disclosed in the '056 patent. These conventional coating systems of the prior art typically require cures, or bakes, between each film layer of the coating system to achieve complete encapsulation of the phosphorescent pigment within the particular film layer and to achieve suitable gloss and DOI. These coating systems are inadequate because they do not allow for wet-on-wet application of the various film layers that make up the coating system. It is widely known in the art that any method requiring cures for each film layer of a coating system is time consuming and expensive because ovens must be used for each cure. Finally, certain phosphorescent coating systems of the prior art strictly rely on conventional phosphorescent pigments such as zinc sulfide, or radioactive substances such as radioisotopes, and reliance on such conventional phosphorescent pigments is not always desirable.

In sum, the coating systems and compositions of the prior art, primarily the uses of the phosphorescent pigment in these coating systems and compositions, are characterized by one or more inadequacy. As a result, it is desirable to implement a method of providing a phosphorescent coating system that is cross-linkable and includes phosphorescent pigment for wet-on-wet application of the coating system to a substrate, such as an automotive body panel.

SUMMARY OF THE INVENTION

A phosphorescent coating system and a method of providing the phosphorescent coating system are disclosed. The phosphorescent coating system is provided on a substrate. The method includes the steps of applying a color-providing composition and an at least partially-transparent clearcoat composition. Either one, or both, of the color-providing composition and the clearcoat composition is cross-linkable. Furthermore, either one, or both, of the color-providing composition and the clearcoat composition includes phosphorescent pigment. The phosphorescent coating system includes a color-providing film layer formed from the color-providing composition, and an at least partially-transparent clearcoat film layer formed form the clearcoat composition.

The color-providing composition is applied to the substrate. Application of the color-providing composition to the substrate forms an uncured film layer of the color-providing composition. The method also includes the step of applying the clearcoat composition to the uncured film layer of the color-providing composition. More specifically, the clearcoat composition is applied to the color-providing composition wet-on-wet. An uncured film layer of the clearcoat composition is formed on the uncured film layer of the color providing composition upon application of the clearcoat composition.

Accordingly, the subject invention offers a phosphorescent coating system and a method that provides a phosphorescent coating system that is cross-linkable and that includes phosphorescent pigment for wet-on-wet application of the coating system to a substrate. Because the phosphorescent coating system of the subject invention is cross-linkable, it is durable. Furthermore, the phosphorescent coating system provided according to the method of the subject invention, is able to achieve satisfactory DOI and phosphorescence for the substrate even with wet-on-wet application of the various film layers of the coating system. As a result, the method of providing the phosphorescent coating system is cost-efficient, and the phosphorescent coating system optimally enhances the visibility of the substrate to others to ensure safety and to improve aesthetic effects.

DETAILED DESCRIPTION OF THE INVENTION

A method of providing a phosphorescent coating system on a substrate includes the steps of applying a color-providing composition and applying an at least partially-transparent clearcoat composition. For descriptive purposes of the subject invention, "at least partially-transparent" is intended to describe fully-transparent clearcoat compositions as well as partially-transparent clearcoat compositions. Partially-transparent clearcoat compositions generally transmit at least 10%, preferably at least 30%, of incident light. The at least partially-transparent clearcoat composition is hereinafter referred to as the "clearcoat composition." Furthermore, in all embodiments of the subject invention, the color-providing composition and the clearcoat composition are preferably liquids that are spray applied to the substrate by air- or rotary-atomized application equipment known in the art. However, it is to be understood that these compositions may also be powder or powder slurry compositions, and may even be applied with different application methods including, but not limited to, electro-deposition.

The color-providing composition is applied to the substrate thereby forming an uncured, or wet, film layer of the color-providing composition. Preferably, the color-providing composition is applied to a color-providing film build that is suitable for hiding an underlying color of the substrate. Of course, the color-providing film build is color dependent. The clearcoat composition is applied wet-on-wet to the uncured film layer of the color-providing composition thereby forming an uncured film layer of the clearcoat composition on the uncured film layer of the color-providing composition. It is to be understood that, for purposes of the subject invention, if the color-providing composition or the clearcoat composition are based on waterborne technology, then the terminology "uncured" is intended to include the pre-bake or pre-cure conditions (i.e., the low bakes or warm air drying) that are typically associated with compositions of waterborne technology. The step of applying the color-providing composition and the step of applying the clearcoat composition, as initially set forth above, are described in greater detail below. The phosphorescent coating system provided by these steps includes a color-providing film layer formed from the color-providing composition, and an at least partially-transparent clearcoat film layer formed form the clearcoat composition.

The color-providing compositions suitable to be utilized in the subject invention include any of a number of types of color-providing compositions known in the art. For the purposes of the subject invention, the types of color-providing compositions do not require explanation in detail as the particular color-providing composition that is utilized does not vary the scope of the subject invention.

Generally, the types of color-providing compositions suitable for application in the subject invention include, but are not limited to, solventborne and waterborne compositions, refinish and OEM-type compositions, and thermosetting and thermoplastic compositions. More specifically, polymers known in the art to be useful in the color-providing compositions include acrylics, vinyls, polyurethanes, polycarbonates, polyesters, alkyds and polysiloxanes. Preferred polymers include acrylics, polyurethanes, and polyesters. As indicated above, the polymer in the color-providing composition may be thermoplastic, but is preferably cross-linkable and therefore includes one or more cross-linkable functional group. Suitable cross-linkable functional groups include, but are not limited to, hydroxy, isocyanate, acid, amine, epoxy, acrylate, vinyl, silane, anhydride, and acetoacetate cross-linkable functional groups. The cross-linkable functional groups may be masked or blocked in such a manner that they become unblocked and therefore available for cross-linking under preferred cure conditions, such as elevated temperatures. These polymers may be self cross-linkable, or may require a separate cross-linking agent that is reactive with the cross-linkable functional groups of the polymer. For example, when the polymer includes a hydroxy cross-linkable functional group, the cross-linking agent may be an aminoplast resin, such as melamine, an isocyanate cross-linking agent, a blocked isocyanate cross-linking agent, an acid, or an anhydride cross-linking agent.

Similarly, the clearcoat compositions suitable to be utilized in the subject invention include any of a number of types of clearcoat compositions known in the art. For the purposes of the subject invention, the types of clearcoat compositions do not require explanation in detail as the particular clearcoat composition that is utilized does not vary the scope of the subject invention.

Generally, the types of clearcoat compositions suitable for application in the subject invention include, but are not limited to, solventborne and waterborne clearcoat compositions, refinish and OEM-type clearcoat compositions, powder and powder slurry clearcoat compositions, and thermosetting and thermoplastic clearcoat compositions. More specifically, polymers known in the art to be useful in the clearcoat compositions include acrylics and polyurethanes cross-linkable with melamine or isocyanate. Polymers for the clearcoat composition preferably have a cross-linkable functional group including, but not limited to, hydroxy, phenol, amino, carboxyl, epoxy, or mercaptan functional groups. Other clearcoat compositions suitable for use in the subject invention are based on carbonate chemistry, carbamate chemistry, and silane chemistry as known in the art. Suitable cross-linking agents reactive with the cross-linkable functional group of the polymer in the clearcoat composition include, but are not limited to, melamine, blocked and unblocked isocyanate, and combinations thereof. As understood by those skilled in the art, the clearcoat composition may include additional components such as ultraviolet light absorbers, hindered amine light stabilizers, surfactants, stabilizers, fillers, wetting agents, rheology control agents, dispersing agents and adhesion promoters. While use of these additional components in clearcoat compositions is well known in the art, the amount or amounts used are varied and controlled to avoid adversely affecting various physical properties of the phosphorescent coating system.

Although it is preferred that both the color-providing composition and the clearcoat composition are cross-linkable, only one of the color-providing composition and the clearcoat composition need be cross-linkable. Furthermore, as emphasized above, the type of cross-linking agent responsible for cross-linking in the color-providing composition, the clearcoat composition, or both, is not critical because the particular type of cross-linking agent utilized does not vary the scope of the subject invention.

At least one of the color-providing composition and the clearcoat composition includes phosphorescent pigment. That is, depending on the particular embodiments described below, the color-providing composition, the clearcoat composition, or even both compositions may include the phosphorescent pigment. The phosphorescent pigment provides phosphorescence for the phosphorescent coating system on the substrate. It is generally understood in the art that phosphorescence is a type of luminescence in which the emission of radiation resulting from excitation of a component, such as the phosphorescent pigment, occurs after the incidence of the radiation. Said another way, phosphorescence is understood as a form of luminescence that is caused by the absorption of radiation at one wavelength followed by delayed reradiation at a different wavelength that continues for a noticeable time after the incident radiation is removed. The phosphorescent pigment provides the phosphorescence because the pigment continues to emit light, i.e., radiation, for a period of time after the removal of an exciting energy source providing the incident radiation. This period of time, also known in the art as an afterglow extinction time, is described in greater detail below. For descriptive purposes, the phosphorescent coating system of the subject invention is hereinafter referred to as the "coating system."

The phosphorescent pigment has an average particle size of from 1 to 50, preferably from 2 to 15, and most preferably from 4 to 8 microns. Of course, it is to be understood that the preferred average particle size of the phosphorescent pigment may vary with the film build of the coating system. As such, coating systems with larger film builds can accommodate phosphorescent pigment of a larger average particle size. It is to be understood that the phosphorescent pigment may form pigment agglomerates. In the most preferred embodiment of the subject invention, the phosphorescent pigment must be appropriately incorporated into the color-providing composition or the clearcoat composition, or both, to ensure that the pigment agglomerates are broken apart, and that the average particle size is approximately 6 microns. Breaking the pigment agglomerates apart enables the coating system to achieve an improved Distinctness Of Image (DOI) that is suitable for automotive coatings. The incorporation of the phosphorescent pigment and the DOI are described in detail below.

The objective of appropriately incorporating the phosphorescent pigment into the color-providing composition or the clearcoat composition is to reduce the average particle size of the phosphorescent pigment and any agglomerates of the phosphorescent pigment to less than 10 microns such that the DOI that can be achieved is maximized. To accomplish this, the phosphorescent pigment and the clearcoat composition may be mixed, under high shear, with a cowles blade. Cowles blades are known in the art. Alternatively, the phosphorescent pigment and the clearcoat composition may be ground with grinding media. In such an embodiment, the grinding media is selected from the group consisting of soft grinding media, hard grinding media, and combinations thereof. Soft grinding media may include sand, glass, alumina, and zirconia beads. On the other hand, hard grinding media may include nylon, styrene, rubber, and plastic beads. To grind the composition or compositions with the bead, the grinding mixture is shaken and then the grinding media is filtered out as is known in the art. Either technique introduced above operates to reduce the average particle size of the phosphorescent pigment to less than 10 microns.

In the most preferred embodiment of the subject invention, the phosphorescent pigment has peak excitation level of from 150 to 500, preferably from 200 to 450, and most preferably from 315 to 375 nanometers (nm). This phosphorescent pigment also has a peak emission level of from 400 to 700, preferably from 410 to 600, and most preferably from 425 to 545 nm. The phosphorescent pigment in the most preferred embodiment also has an afterglow brightness of at least 100, preferably of at least 150, and most preferably of at least 200, mCd/m$^2$. It is to be understood that the afterglow brightness is defined as the brightness of the most preferred coating system having the phosphorescent pigment after 10 minutes of excitation with a D$_{65}$ illuminant for 4 minutes at 200 lux. This phosphorescent pigment is also termed a long persistent phosphorescent pigment having an afterglow extinction time of at least 1000, most preferably of at least 2000, minutes. The afterglow extinction time was described, in brief, above. It is to be understood that the afterglow extinction time is defined as the time span necessary for afterglow brightness to diminish to 0.32 mCd/m$^2$. It is understood in the art that a diminishment of 0.32 mCd/m$^2$ is 100 times the eye perception limit of the human eye.

The phosphorescent pigment includes a matrix of a phosphorescent phosphor of the general formula MAl$_2$O$_4$:X wherein M is selected from the group consisting of calcium, strontium, barium, and combinations thereof, and X is at least one activation element suitable for activating MAl$_2$O$_4$. A phosphorescent phosphor, as is known in the art, is a substance that is capable of luminescence. In one embodiment, the at least one least one activation element X is europium. In alternative embodiments of the subject invention, the at least one activation element X is selected from the group consisting of europium, lanthanum, cerium, praseodymium, neodymium, samarium, gadolinium, dysprosium, holmium, erbium, thulium, ytterbium, lutetium, tin, bismuth, and combinations thereof. There may also be co-activation elements present.

The most preferred phosphorescent pigment is a strontium aluminate having europium as an activation element, specifically of the formula SrAl$_2$O$_4$:Eu. This phosphorescent pigment is commercially available as LumiNova® Green (G-300 FFS) from Nemoto & Co., Ltd., Tokyo, Japan. Also, this phosphorescent pigment, and others like it, are set forth in U.S. Pat. No. 5,424,006, the disclosure of which is incorporated herein by reference in its entirety. Alternative phosphorescent pigments are commercially available as Permaglow® Pigments from Hirotec Inc., Huntington Beach, Calif. It is to be understood that the phosphorescent pigment of the subject invention also may include conventional phosphorescent pigments such as zinc sulfide, or radioactive substances such as radioisotopes. Finally, although it is not preferred, the phosphorescent pigment may be included in more than one composition at the same time. That is, the phosphorescent pigment may be included in both the color-providing composition and the clearcoat composition in one coating system.

For purposes of the subject invention, the terminology of color-providing composition is intended to include any composition that can modify an original color of an underlying substrate. General examples of such color-providing compositions include, without limitation, pigmented basecoat compositions having organic pigments, inorganic pigments, metallic flakes, and/or mica flakes; clear binder compositions including the phosphorescent pigment; and partially-clear or transparent binder compositions such as tinted clearcoat compositions as known in the art.

As described above, the phosphorescent pigment provides the phosphorescence for the coating system on the substrate. Although the coating system is preferably provided on a body panel of an automobile, i.e., an automotive body panel, as the substrate, the coating system may be applied to other suitable substrates such as concrete, blacktop, highway markers, construction markers, boats, airplanes, recreational vehicles, appliances, and the like. Furthermore, although the coating system is preferably applied to an automotive body panel that is metallic, the coating system may alternatively be applied to other automotive body panels including, but not limited to, plastic substrates such as a bumper, mirror, or internal dashboard of the automobile, aluminum substrates, and galvanized steel substrates.

Depending on the embodiment, the color-providing composition includes from 5 to 30, preferably from 8 to 15, parts by weight of the phosphorescent pigment based on 100 parts by weight of the color-providing composition. The color-providing composition may also include at least one pigment selected from the group consisting or organic pigments, inorganic pigments, and combinations thereof. Suitable organic and inorganic pigments are described in detail below. If a pigment other than the phosphorescent pigment is present in the color-providing composition, then the pigment is preferably present from 5 to 40, more preferably from 8 to 25, parts by weight of pigment based on 100 parts by weight of the color-providing composition. Also depending on the embodiment, the clearcoat composition includes from 5 to 30, preferably from 8 to 15, parts by weight of the phosphorescent pigment based on 100 parts by weight of the clearcoat composition. In addition to the phosphorescent pigment, at least one, or even both, of the color-providing composition and the clearcoat composition may further include retroreflective microspheres. One suitable retroreflective microsphere is commercially available from Reflective Technologies Industries, Ltd., a subsidiary of Reflec Plc., located in Winsford, Chesire, United Kingdom.

In all embodiments of the subject invention, the uncured film layers of the color-providing composition and the clearcoat composition are simultaneously cured such that one, or both, of the color-providing composition and the clearcoat composition cross-links. Although various methods may be used for curing, heat-curing is preferred. Generally, heat curing is conducted by exposing the coating system on the substrate to elevated temperatures provided primarily by radiating heat sources. As understood by those skilled in the art, preferred conditions for cure vary depending on the type (i.e., the chemistry and polymer make-up) of the color-providing composition and the clearcoat composition. More specifically, curing temperatures vary depending on the particular blocking groups used in the cross-linking agents. Generally, however, the curing temperatures range from 250 degree F. to 385 degree F. The duration of the cure may also vary depending on the chemistry and polymer make-up, on the particular cross-linking agents, and on physical parameters of the coating system such as the film build. Generally, the duration of the cure ranges from 15 to 60 minutes.

As a result of the cure, at least one of these compositions cross-links to provide the coating system. Upon cure, the coating system, including the film layers formed from the wet-on-wet application of the clearcoat composition to the color-providing composition, has a DOI of at least 5.5, preferably of at least 6.5. The DOI is measured as described in ASTM E430-97 and is described in greater detail below in terms of particular embodiments. Also upon cure, the coating system in certain embodiments of the subject invention achieve a 60 degree gloss of at least 75, preferably of at least 85, as defined by ASTM D523-89 (Re-Approved 1999) as measured with a BYK-Gardner Micro-Gloss Meter, specifically Model No. GB-4501. Upon simultaneous cure, a film build of the coating system is established. The film build of the coating system ranges from 10 to 100, more preferably from 30 to 90, microns. It is to be understood that the film build is the total film build of the coating system including all of the film layers present.

Referring now to one particular embodiment, the color-providing composition is applied to the substrate, and the uncured film of the color-providing composition is formed. The step of applying the color-providing composition to the substrate is further defined as applying a pigmented basecoat composition to the substrate. As a result, the uncured film layer of the color-providing composition is formed of the pigmented basecoat composition. After cure, a pigmented basecoat film layer is formed from the pigmented basecoat composition.

The pigmented basecoat composition preferably includes from 5 to 40, more preferably from 8 to 25, parts by weight of pigment based on 100 parts by weight of the pigmented basecoat composition. In the most preferred embodiment of the subject invention, the pigmented basecoat composition that is applied to the substrate is further includes green and yellow pigments as described in detail below. Of course, it is to be understood that other pigments, both organic and inorganic, may be included in the pigmented basecoat composition without varying the scope of the subject invention. Suitable organic pigments include, but are not limited to, metallized and non-metallized azo pigments, azomethine pigments, methine pigments, anthraquinone pigments, phthalocyanine pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments, monoarylide and diarylide yellows, benzimidazolone yellows, tolyl orange, naphthol orange, and quinophthalone pigments. Specific examples of suitable pigments include, without limitation, quinacridone pigments, such as C.I. Pigment Red 202, C.I. Pigment Violet 19, and C.I. Pigment Red 122; perylene pigments, such as C.I. Pigment Red 179; azo condensation pigments, such as C.I. Pigment Red 170, C.I. Pigment Red 144, and C.I. Pigment Brown 23; isoindolinone pigments, such as C.I. Pigment Orange 61, C.I. Pigment Yellow 109, and C.I. Pigment Yellow 110; diketopyrrolopyrrole pigments, such as C.I. Pigment Red 254, C.I. Pigment Red 255, C.I. Pigment Red 264, C.I. Pigment Orange 71, and C.I. Pigment Orange 73; copper phthalocyanine pigments such as C.I. Pigment Blue 15; and anthraquinone pigments, such as C.I. Pigment Blue 60, C.I. Pigment Red 177, and C.I. Pigment Yellow 147. Suitable inorganic pigments include, but are not limited to, oxide pigments such as titanium dioxide, carbon black, iron oxides including red iron oxide, black iron oxide, and brown iron oxide, chromium oxide green, ferric ferrocyanide (Prussian blue), ultramarine, lead chromate, and the like. Other optional pigments include, mica flakes and color-variable pigments such as coated aluminum flakes. Fluorescent pigments may also be included. The fluorescent pigments emit radiation only while receiving incident radiation.

In this same embodiment, the phosphorescent pigment is included in the clearcoat composition such that exposure of the phosphorescent pigment to an external incident energy source is maximized. The clearcoat composition is applied wet-on-wet to the uncured layer of the color-providing composition to form the uncured layer of the clearcoat composition. The step of applying the clearcoat composition is more specifically defined as applying the clearcoat composition, which includes the phosphorescent pigment, wet-on-wet to the uncured film layer of the pigmented basecoat composition. In this particular embodiment, the phosphorescent pigment is present in the clearcoat composition from 5 to 30, preferably from 8 to 15, parts by weight based on 100 parts by weight of the clearcoat composition.

In this embodiment, after the clearcoat composition is applied wet-on-wet, the uncured film layers of the pigmented basecoat composition and the clearcoat composition are simultaneously cured to provide the coating system with the phosphorescent pigment in the clearcoat composition. The simultaneous cure of the pigmented basecoat composition and the clearcoat composition forms the basecoat and clearcoat film layers, respectively. Upon cure, at least one of the compositions cross-links, and the coating system, in this embodiment, has a DOI of at least 5.5, preferably of at least 6.5 as defined by ASTM E430-97. The DOI is measured with a BYK-Gardner Wave-Scan DOI Meter, specifically Model Nos. 4800 and 4816.

In this embodiment, with the phosphorescent pigment in an outermost film layer of the coating system, specifically in the clearcoat film layer formed from the clearcoat composition, the gloss of the coating system may be partially sacrificed, if desired, to further enhance the phosphorescence effect of the coating system resulting from the phosphorescent pigment. Of course, if increased gloss is desired for this embodiment, then a second, at least partially-transparent clearcoat composition may be applied either before cure or after cure. Such a second clearcoat composition would be free of phosphorescent pigment and would function to further enhance the appearance properties of the coating system, such as DOI and gloss.

In a further embodiment, the step of applying the color-providing composition is further defined as applying a pigmented basecoat composition to the substrate that includes the phosphorescent pigment. As a result, the uncured film layer of the color-providing composition is further defined as a pigmented basecoat film layer formed of the pigmented basecoat composition including the phosphorescent pigment. The clearcoat composition, which, in this embodiment is free of the phosphorescent pigment, is then applied wet-on-wet to the uncured film layer of the pigmented basecoat composition to at least partially cover the phosphorescent pigment in the pigmented basecoat composition.

In this particular embodiment, the pigmented basecoat composition includes from 5 to 30, preferably from 8 to 15, parts by weight of the phosphorescent pigment based on 100 parts by weight of the color-providing composition. The pigmented basecoat composition may also include pigments, other than the phosphorescent pigment, at levels of from 5 to 40, more preferably from 8 to 25, parts by weight of pigment based on 100 parts by weight of the color-providing composition.

The uncured film layers of the pigmented basecoat composition, having the phosphorescent pigment, and the clearcoat composition are then simultaneously cured thereby forming the pigmented basecoat film layer and the clearcoat film layer, respectively. At least one the pigmented basecoat composition and the clearcoat composition cross-links to provide the coating system with the phosphorescent pigment in the pigmented basecoat composition. Upon cure, the coating system of this embodiment also has a DOI of at least 5.5, preferably of at least 6.5 as defined by ASTM E430-97. The DOI is measured as described above with a BYK-Gardner Wave-Scan DOI Meter, specifically Model Nos. 4800 and 4816.

The following example illustrating the formation of the phosphorescent coating system according to the subject invention, as presented herein, is intended to illustrate and not limit the invention.

EXAMPLE

The phosphorescent coating system was prepared by adding and reacting the following parts, by weight, unless otherwise indicated.

| Phosphorescent Coating System | Amount (grams) |
|---|---|
| Pigmented Basecoat Composition | |
| Polymer Component (polyester-based) | 76.9 |
| Pigment Component (dispersion of yellow pigment) | 20.7 |
| Pigment Component (dispersion of green pigment) | 2.4 |
| Total | 100.0 |
| Clearcoat Composition | |
| Clearcoat Polymer Component | 60.9 |
| Clearcoat Cross-Linking Agent (isocyanate-based) | 18.3 |
| Phosphorescent Pigment | 11.7 |
| Spray Reduction Agent | 9.1 |
| Total | 100.0 |

The above Example is a representation of the embodiment described above referencing the pigmented basecoat composition and the clearcoat composition with the phosphorescent pigment included in the clearcoat composition. The pigmented basecoat composition includes 76.9 parts by weight of a polyester-based polymer, 20.7 parts by weight of a yellow dispersion pigment component, and 2.4 parts by weight of a green dispersion pigment component, all based on 100 parts by weight of the pigmented basecoat composition. In this Example, the clearcoat composition includes the phosphorescent pigment. Furthermore, in this Example, the clearcoat composition is the composition of the phosphorescent coating system that is cross-linkable. More specifically, the clearcoat composition includes 60.9 parts by weight of a clearcoat polymer component, 18.3 parts by weight of an isocyanate-based clearcoat cross-linking agent, 11.7 parts by weight of the phosphorescent pigment, and 9.1 parts by weight of the spray reduction agent, all based on 100 parts by weight of the clearcoat composition. The spray reduction agent is known in the art for optimum application of the clearcoat composition.

The pigmented basecoat composition and the clearcoat composition were both individually spray applied wet-on-wet to the substrate. After application, the compositions were simultaneously cured to provide the phosphorescent coating system with the phosphorescent pigment in the clearcoat composition. In this Example, although not preferred, the clearcoat composition, having the phosphorescent pigment was ground, as described above, to optimize the DOI of the coating system having the phosphorescent pigment in the clearcoat film layer formed from the clearcoat composition. This coating system resulted in a satisfactory DOI ranging from 5.5 to 6.6 as defined by ASTM E430-97. The BYK-Gardner Wave-Scan DOI Meter Model No. GB-4800 was used to evaluate the DOI.

Finally, the above Example is understood by those skilled in the art to be generally representative of a typical refinish-type coating system where the pigmented basecoat composition is not cross-linkable, and the clearcoat composition is cross-linkable. It is to be understood that OEM-type coating systems, where both the pigmented basecoat composition and the clearcoat composition are cross-linkable, are also preferred.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of providing a phosphorescent coating system on a substrate, said method comprising the steps of:
   (A) applying a color-providing composition to the substrate thereby forming an uncured film layer of the color-providing composition; and
   (B) applying an at least partially-transparent clearcoat composition wet-on-wet to the uncured film layer of the color-providing composition thereby forming an uncured film layer of the clearcoat composition on the uncured film layer of the color-providing composition, wherein the clearcoat composition comprises phosphorescent pigment such that exposure of the phosphorescent pigment to an external incident energy source is maximized;
   with at least one of the color-providing composition and the clearcoat composition being cross-linkable.

2. A method as set forth in claim 1 wherein the step of (A) applying the color-providing composition is further defined as applying a pigmented basecoat composition to the substrate such that the uncured film layer of the color-providing composition is formed of the pigmented basecoat composition.

3. A method as set forth in claim 2 wherein the step of applying the pigmented basecoat composition to the substrate is further defined as applying a pigmented basecoat composition comprising from 5 to 40 parts by weight of pigment based on 100 parts by weight of the pigmented basecoat composition.

4. A method as set forth in claim 2 wherein the step of applying the pigmented basecoat composition to the substrate is further defined as applying a pigmented basecoat composition comprising at least one pigment selected from the group consisting or organic pigments, inorganic pigments, and combinations thereof.

5. A method as set forth in claim 1 wherein the step of applying the clearcoat composition comprising the phosphorescent pigment is further defined as applying a clearcoat composition comprising from 5 to 30 parts by weight of the phosphorescent pigment based on 100 parts by weight of the clearcoat composition.

6. A method as set forth in claim 1 further comprising the step of simultaneously curing the uncured film layers of the pigmented basecoat composition and the clearcoat composition to provide the phosphorescent coating system with the phosphorescent pigment in the clearcoat composition.

7. A method as set forth in claim 6 wherein the step of simultaneously curing the uncured film layers to provide the phosphorescent coating system is further defined as simultaneously curing the uncured film layers to establish a DOI for the phosphorescent coating system of at least 5.5, as defined by ASTM E430-97.

8. A method as set forth in claim 1 wherein the step of (A) applying the color-providing composition is further defined as applying a pigmented basecoat composition to the substrate wherein the pigmented basecoat composition also comprises the phosphorescent pigment and the uncured film layer of the color-providing composition is formed of the pigmented basecoat composition comprising the phosphorescent pigment.

9. A method as set forth in claim 8 wherein the step of applying the pigmented basecoat composition to the substrate is further defined as applying a pigmented basecoat composition comprising from 5 to 40 parts by weight of pigment based on 100 parts by weight of the pigmented basecoat composition.

10. A method as set forth in claim 8 wherein the step of applying the pigmented basecoat composition to the substrate is further defined as applying a pigmented basecoat composition comprising from 5 to 30 parts by weight of the phosphorescent pigment based on 100 parts by weight of the pigmented basecoat composition.

11. A method as set forth in claim 8 wherein the step of (B) applying the at least partially-transparent clearcoat composition is further defined as applying the clearcoat composition wet-on-wet to the uncured film layer of the pigmented basecoat composition to at least partially cover the phosphorescent pigment in the pigmented basecoat composition.

12. A method as set forth in claim 11 further comprising the step of simultaneously curing the uncured film layers of the pigmented basecoat composition, comprising the phosphorescent pigment, and the clearcoat composition comprising the phosphorescent pigment to provide the phosphorescent coating system with the phosphorescent pigment in both the pigmented basecoat composition and the clearcoat composition.

13. A method as set forth in claim 12 wherein the step of simultaneously curing the uncured film layers to provide the phosphorescent coating system is further defined as simultaneously curing the uncured film layers to establish a DOI for the phosphorescent coating system of at least 5.5, as defined by ASTM E430-97.

14. A method as set forth in claim 1 wherein the phosphorescent pigment has an average particle size of from 1 to 50 microns.

15. A method as set forth in claim 1 wherein the phosphorescent pigment has peak excitation level of from 150 to 500 nanometers.

16. A method as set forth in claim 1 wherein the phosphorescent pigment has a peak emission level of from 400 to 700 nanometers.

17. A method as set forth in claim 1 wherein the phosphorescent pigment has an afterglow brightness of at least 100 mCd/m$^2$.

18. A method as set forth in claim 1 wherein the phosphorescent pigment is a long persistent phosphorescent pigment having an afterglow extinction time of at least 1000 minutes.

19. A method as set forth in claim 1 wherein the phosphorescent pigment comprises a matrix of a phosphorescent phosphor of the general formula $MAl_2O_4$:X wherein M is selected from the group consisting of calcium, strontium, barium, and combinations thereof, and X is at least one activation element suitable for activating $MAl_2O_4$.

20. A method as set forth in claim 19 wherein the at least one activation element X is europium.

21. A method as set forth in claim 19 wherein the at least one activation element X is selected from the group consisting of europium, lanthanum, cerium, praseodymium, neodymium, samarium, gadolinium, dysprosium, holmium, erbium, thulium, ytterbium, lutetium, tin, bismuth, and combinations thereof.

22. A method as set forth in claim 1 wherein the phosphorescent pigment is $SrAl_2O_4$:Eu.

23. A method as set forth in claim 1 wherein the step of (A) applying the color-providing composition is further defined as applying a color-providing composition comprising from 5 to 30 parts by weight of the phosphorescent pigment based on 100 parts by weight of the color-providing composition.

24. A method as set forth in claim 1 wherein the step of (B) applying the at least partially-transparent clearcoat composition is further defined as applying an at least partially-transparent clearcoat composition comprising from 5 to 30 parts by weight of the phosphorescent pigment based on 100 parts by weight of the clearcoat composition.

25. A method as set forth in claim 1 wherein the step of (A) applying the color-providing composition is further defined as applying a color-providing composition comprising from 5 to 40 parts by weight of pigment based on 100 parts by weight of the color-providing composition.

26. A method as set forth in claim 1 wherein;
the step of (A) applying the color-providing composition is further defined as spray applying the color-providing composition, and
the step of (B) applying the at least partially-transparent clearcoat composition is further defined as spray applying the at least partially-transparent clearcoat composition.

27. A method as set forth in claim 1 wherein the step of (A) applying the color-providing composition to the substrate is further defined as applying the color-providing composition to an automotive body panel.

28. A method as set forth in claim 1 further comprising the step of simultaneously curing the uncured film layers of the color-providing composition and the clearcoat composition such that at least one of the color-providing composition and the clearcoat composition cross-links to provide the phosphorescent coating system.

29. A method as set forth in claim 28 wherein the step of simultaneously curing the uncured film layers to provide the phosphorescent coating system is further defined as simultaneously curing the uncured film layers to establish a DOI for the phosphorescent coating system of at least 5.5, as defined by ASTM E430-97.

30. A method as set forth in claim 1 further comprising the step of incorporating the phosphorescent pigment into the clearcoat composition prior to the step of (B) applying the at least partially-transparent clearcoat composition to reduce an average particle size of the phosphorescent pigment and any agglomerates of the phosphorescent pigment to less than 10 microns.

31. A method as set forth in claim 30 wherein the step of incorporating the phosphorescent pigment into the clearcoat composition is further defined as high shear mixing the phosphorescent pigment and the clearcoat composition with a cowles blade to reduce the average particle size of the phosphorescent pigment and any agglomerates of the phosphorescent pigment to less than 10 microns.

32. A method as set forth in claim 30 wherein the step of incorporating the phosphorescent pigment into the clearcoat composition is further defined as grinding the phosphorescent pigment and the clearcoat composition with grinding media selected from the group consisting of sand, glass, alumina, zirconia beads, nylon beads, styrene beads, rubber beads, plastic beads, and combinations thereof to reduce the average particle size of the phosphorescent pigment and any agglomerates of the phosphorescent pigment to less than 10 microns.

33. A method as set forth in claim 30 further comprising the step of simultaneously curing the uncured film layers of the color-providing composition and the clearcoat composition to establish a DOI for the phosphorescent coating system of at least 5.5, as defined by ASTM E430-97.

34. A method as set forth in claim 1 wherein the step of (A) applying the color providing composition is further defined as applying a color-providing composition comprising retroreflective microspheres.

35. A method as set forth in claim 1 wherein the step of (B) applying the at least partially-transparent clearcoat composition is further defined as applying a clearcoat composition comprising retroreflective microspheres.

36. A phosphorescent coating system comprising:
a substrate;
a color-providing film layer formed from a color-providing composition applied to said substrate; and
an at least partially-transparent clearcoat film layer formed from an at least partially-transparent clearcoat composition applied wet-on-wet to said color-providing composition as said color-providing composition is uncured, wherein said clearcoat composition comprises phosphorescent pigment such that exposure of said phosphorescent pigment to an external energy source is maximized;
with at least one of said color-providing composition and said clearcoat composition being cross-linkable.

37. A phosphorescent coating system as set forth in claim 36 wherein said color-providing film layer is further defined as a pigmented basecoat film layer formed from a pigmented basecoat composition applied to said substrate.

38. A phosphorescent coating system as set forth in claim 37 wherein said pigmented basecoat composition comprises from 5 to 40 parts by weight of pigment based on 100 parts by weight of said pigmented basecoat composition.

39. A phosphorescent coating system as set forth in claim 37 wherein said pigmented basecoat composition comprises at least one pigment selected from the group consisting or organic pigments, inorganic pigments, and combinations thereof.

40. A phosphorescent coating system as set forth in claim 36 wherein said clearcoat composition comprises from 5 to 30 parts by weight of said phosphorescent pigment based on 100 parts by weight of said clearcoat composition.

41. A phosphorescent coating system as set forth in claim 36 wherein said pigmented basecoat composition and said clearcoat composition are simultaneously cured to form said pigmented basecoat film layer and said clearcoat film layer, respectively.

42. A phosphorescent coating system as set forth in claim 41 having a DOI of at least 5.5, as defined by ASTM E430-97.

43. A phosphorescent coating system as set forth in claim 36 wherein said color-providing film layer is further defined as a pigmented basecoat film layer formed from a pigmented basecoat composition also comprising said phosphorescent pigment and being applied to said substrate.

44. A phosphorescent coating system as set forth in claim 43 wherein said pigmented basecoat composition comprises from 5 to 40 parts by weight of pigment based on 100 parts by weight of said pigmented basecoat composition.

45. A phosphorescent coating system as set forth in claim 43 wherein said pigmented basecoat composition comprises from 5 to 30 parts by weight of said phosphorescent pigment based on 100 parts by weight of said pigmented basecoat composition.

46. A phosphorescent coating system as set forth in claim 43 wherein said clearcoat composition is applied wet-on-wet to said pigmented basecoat composition to at least partially cover said phosphorescent pigment in said pigmented basecoat composition.

47. A phosphorescent coating system as set forth in claim 46 wherein said pigmented basecoat composition and said clearcoat composition are simultaneously cured to form said pigmented basecoat film layer and said clearcoat film layer, respectively.

48. A phosphorescent coating system as set forth in claim 47 having a DOI of at least 5.5, as defined by ASTM E430-97.

49. A phosphorescent coating system as set forth in claim 36 wherein said phosphorescent pigment has an average particle size of from 1 to 50 microns.

50. A phosphorescent coating system as set forth in claim 36 wherein said phosphorescent pigment has peak excitation level of from 150 to 500 nanometers.

51. A phosphorescent coating system as set forth in claim 36 wherein said phosphorescent pigment has a peak emission level of from 400 to 700 nanometers.

52. A phosphorescent coating system as set forth in claim 36 wherein said phosphorescent pigment has an afterglow brightness of at least 100 mCd/m$^2$.

53. A phosphorescent coating system as set forth in claim 36 wherein said phosphorescent pigment is a long persistent phosphorescent pigment having an afterglow extinction time of at least 1000 minutes.

54. A phosphorescent coating system as set forth in claim 36 wherein said phosphorescent pigment comprises a phosphorescent phosphor matrix of the general formula $MAl_2O_4$:X wherein M is selected from the group consisting of calcium, strontium, barium, and combinations thereof, and X is at least one activation element suitable for activating $MAl_2O_4$.

55. A phosphorescent coating system as set forth in claim 54 wherein said at least one activation element X suitable for activating $MAl_2O_4$ is europium.

56. A phosphorescent coating system as set forth in claim 54 wherein said at least one activation element X suitable for activating $MAl_2O_4$ is selected from the group consisting of europium, lanthanum, cerium, praseodymium, neodymium, samarium, gadolinium, dysprosium, holmium, erbium, thulium, ytterbium, lutetium, tin, bismuth, and combinations thereof.

57. A phosphorescent coating system as set forth in claim 36 wherein said phosphorescent pigment is $SrAl_2O_4$:Eu.

58. A phosphorescent coating system as set forth in claim 36 wherein said color-providing composition comprises from 5 to 30 parts by weight of said phosphorescent pigment based on 100 parts by weight of said color-providing composition.

59. A phosphorescent coating system as set forth in claim 36 wherein said clearcoat composition comprises from 5 to 30 parts by weight of said phosphorescent pigment based on 100 parts by weight of said clearcoat composition.

60. A phosphorescent coating system as set forth in claim 36 wherein said color-providing composition comprises from 5 to 40 parts by weight of pigment based on 100 parts by weight of said color-providing composition.

61. A phosphorescent coating system as set forth in claim 36 wherein said color-providing composition is spray applied to said substrate, and said clearcoat composition is spray applied wet-on-wet to said color-providing composition.

62. A phosphorescent coating system as set forth in claim 36 wherein said substrate is an automotive body panel.

63. A phosphorescent coating system as set forth in claim 36 wherein said color-providing composition and said clearcoat composition are simultaneously cured to form said color-providing film layer and said clearcoat film layer, respectively, wherein at least one of said color-providing composition and said clearcoat composition cross-links as a result of the cure.

64. A phosphorescent coating system as set forth in claim 63 having a DOI of at least 5.5, as defined by ASTM E430-97.

65. A phosphorescent coating system as set forth in claim 63 wherein said phosphorescent pigment has an average particle size of from 1 to 10 microns.

66. A phosphorescent coating system as set forth in claim 65 having a DOI of at least 5.5, as defined by ASTM E430-97.

67. A phosphorescent coating system as set forth in claim 36 wherein at least one of said color-providing composition and said clearcoat composition comprises retroreflective microspheres.

* * * * *